US005127138A

United States Patent [19]

Lim

[11] Patent Number: 5,127,138

[45] Date of Patent: Jul. 7, 1992

[54] METHOD AND APPARATUS FOR MECHANICALLY ASSEMBLING A VENETIAN BLIND

[75] Inventor: Guy H. Lim, Rotterdam, Netherlands

[73] Assignee: Hunter Douglas International N.V., Curacao, Netherlands

[21] Appl. No.: 618,771

[22] Filed: Nov. 27, 1990

Related U.S. Application Data

[60] Division of Ser. No. 383,767, Jul. 24, 1989, which is a continuation of Ser. No. 206,231, Jun. 13, 1988, abandoned.

[30] Foreign Application Priority Data

Jun. 18, 1987 [EP] European Pat. Off. ........ 87305425.8

[51] Int. Cl.[5] ........ B23P 19/04

[52] U.S. Cl. ........ 29/24.5; 29/771

[58] Field of Search ........ 29/24.5, 428, 445, 433, 29/771; 160/166.1, 168.1, 178.3; 53/566, 252, 585, 542

[56] References Cited

U.S. PATENT DOCUMENTS

| | | | |
|---|---|---|---|
| 1,217,603 | 2/1917 | Jester | 52/243 |
| 2,532,294 | 12/1950 | Edwards et al. | 29/241 |
| 2,728,108 | 12/1955 | Schlegel, Jr. | 18/47.5 |
| 3,281,914 | 11/1966 | Hunter et al. | 29/24.5 |
| 3,332,188 | 7/1967 | Schaefer | 52/349 |
| 3,521,337 | 7/1970 | Peeters | 29/24.5 |
| 3,531,838 | 10/1970 | Peeters | 29/24.5 |
| 3,736,631 | 6/1973 | Edixhoven | 29/24.5 |
| 4,053,132 | 10/1977 | Del Pozzo | 248/235 |
| 4,073,044 | 2/1978 | Edixhoven | 29/24.5 |
| 4,188,693 | 2/1980 | Edixhoven | 29/24.5 |
| 4,448,004 | 5/1984 | Thorsell | 52/241 |
| 4,514,886 | 5/1985 | Edixhoven | 29/24.5 |
| 4,516,300 | 5/1985 | Gaillard et al. | 29/24.5 |
| 4,538,330 | 9/1985 | Edixhoven | 29/24.5 |
| 4,543,699 | 10/1985 | Anderson | 29/24.5 |
| 4,545,100 | 10/1985 | Gaillard et al. | 29/24.5 |

FOREIGN PATENT DOCUMENTS

| | | |
|---|---|---|
| 490979 | 3/1953 | Canada . |
| 3328121 | 2/1985 | Fed. Rep. of Germany . |
| 220865 | 4/1985 | German Democratic Rep. . |
| 561086 | 4/1957 | Italy . |

*Primary Examiner*—Joseph M. Gorski
*Attorney, Agent, or Firm*—Pennie & Edmonds

[57] ABSTRACT

A method an apparatus for mechanically assembling a venetian blind in which at least two ladders 30 each having laterally spaced side members 42 and cross rungs 44 are spaced apart by a predetermined spacing and fed intermittently along a direction lengthwise of said side members 42, by a pair of side member guides 46 for each ladder. The guides of a pair being spaced by a predetermined spacing to hold at least a portion of said side members apart, spreading means being provided to hold apart two adjacent rungs 44 at the location of said portion of the side members to define the shape of the associated opening 45 in each ladder. Slat material guides 36, 38 are positioned relative to the side member guides 46 so that the slat material is fed at an angle other than 90° to the plane including the longitudinal sides of the slat material as it is guided along the defined path by a slat material guide.

11 Claims, 3 Drawing Sheets

METHOD AND APPARATUS FOR MECHANICALLY ASSEMBLING A VENETIAN BLIND

This is a division of application Ser. No. 07/383,767 filed Jul. 24, 1989 which is a filewrapper continuation of application Ser. No. 07/206,231 filed Jun. 13, 1988 and now abandoned.

FIELD OF THE INVENTION

The present invention relates to a method and apparatus for mechanically assembling a venetian blind.

BACKGROUND OF THE INVENTION

Venetian blinds consist of at least two ladders, either ladder cords or ladder tapes, each having laterally spaced side members and cross rungs defining openings to receive slats. The assembly can be done manually or by machine and in the latter case the ladders by ladder feed means are intermittently fed lengthwise of the side members and by ladder guide or -spreader means are guided so that two adjacent rungs of each ladder are held apart at least substantially parallel to one another and the portions of the longitudinal side members at the location of the two adjacent rungs are held apart at least substantially parallel to one another, thereby to give a predetermined shape to the associated opening. The slat material is fed by slat material feed means along a defined path through the relevant associated openings, thereby guided by slat material guiding means.

This works reasonably satisfactorily for slats having a width of 25 mm or more, but it has been found that it is difficult to achieve satisfactory results with narrower blinds, for example blinds having slats which are 16 mm wide. These slats themselves tend to be rather flimsy and the opening in the ladders into which they are to be introduced is relatively small. Furthermore, in order to cover a given window surface a much greater number of slats need to be inserted into the ladder. It will be appreciated that the speed of the assembly machines is limited by the operation of the assembly work stations and the increase of speed which would be necessary to manufacture a blind to cover a given window space using these much narrower slats is not enhanced by the use of smaller dimensions of the slats and the openings formed in the ladders.

SUMMARY OF THE INVENTION

According to the present invention during the performing of the common assembling steps described in the BACKGROUND OF THE INVENTION at least said ladder guide means and said slat material guiding means are held positioned relative to one another so that considered in a plane perpendicular to the slat feed direction at the location of the relevant opening, an angle other than 90° is formed between a plane passing through the longitudinal edges of the slat material and the the two side members. In particular, the plane bisects the acute angles formed between the side members and cross rungs.

In this way, the slats can be fed generally diagonally through the openings so that there is a bigger "target" for the slat material to see as it is introduced into the relevant opening in the ladder.

Reference is made to the "longitudinal edges" of the slat material. Conventional slats are either flat sheet material or slightly arcuately bowed material. In this instance the longitudinal edges referred to will be the actual longtidunal edges of the material. However, some venetian blinds have different cross sectional configurations, for example the slat material can be generally S-shaped in cross section. Here the longitudinal edges referred to above will be the lateral extremes of the slat material rather than the actual edges, which will then be laterally inward of the longitudinal edges.

The portions of the side members may be positioned at an angle to the vertical as the slat material is fed along the feed path and this in itself will ensure that the plane of the slat material is other than 90° to the length if this plane is itself horizontal. Alternatively, or additionally, the cross rungs can be positioned at an angle other than 90° to the said portions of the side members and/or the plane which passes through the longitudinal edges of the slat material, as it is fed along the defined feed path and through the relevant ladder openings, can in itself be inclined to the horizontal.

Where the plane of the slat material is itself horizontal, the slat material may be guided to the defined feed path from a reel of slat material, this reel having its axis inclined at an angle to the horizontal in the same sense as the angle at which the slat material is fed and guided along the defined feed path. In this way the reel may be positioned to rest against the surface, so that the reel is braked by the friction surface, as it rotates upon the slat material being unwound therefrom. In this way as the material is unwound, the frictional force will progressively reduce to compensate the intermittent unreeling movement. Advantageously the angle which the plane of the slat material makes to the ladder side members is between 30° and 60°.

The invention also provides an apparatus for mechanically assembling a venetian blind, with ladders comprising side members and cross rungs, said apparatus comprising ladder feed means and ladder guide means, the latter means performing the guiding and spreading of side member-portions and of the cross rungs to determine relevant ladder openings for inserting the slat material, slat material feeding means and slat material guiding means for feeding and guiding the slat material along a defined path to and through the relevant ladder openings, wherein at least said ladder guide means and said slat material guiding means are positioned relative to each other so that considered in a plane perpendicular to the slat feed direction at the location of the relevant openings, the side member portions are at an angle other than 90° relative to the plane that passes through the longitudinal edges of the slat material when advancing to and through the relevant openings of the ladders.

Within that inventive concept, the ladder guide means are positioned so that the side member portions may each extend at an angle to the vertical and/or the slat material guiding means may be positioned so that the plane which passes through the longitudinal edges of the slat material, as it is fed along the defined path and through the relevant openings, is inclined to the horizontal.

Thereby the ladder feed means and/or the slat material feed means may additionally be positioned in accordance with the position of the respective ladder guide means and the slat material guiding means.

It will be clear that the invention is suitable for the systems of 'overlacing' and 'interlacing'. With the latter is meant the system whereby each cross rung is formed by at least two parallel cross members and the slat is inserted between the cross members.

The ladder feed means e.g. ladder lift means, the ladder guide means e.g. spreader means, the slat material feeding means and the slat material guiding means are in itself common in the technique of venetian blind assembling machines and examples of such means are shown and described among others in commonly-assigned U.S. Pat. Nos. 4,514,886 and 4,516,300 (see FIGS. 1, 2, and 3).

In order that the present invention may more readily be understood, the following description is given, merely by way of example, of a presently preferred method and apparatus for carrying out the invention, reference being made to the accompanying drawings.

DETAILED DESCRIPTION OF PRESENTLY PREFERRED EMBODIMENT

Figure 1:
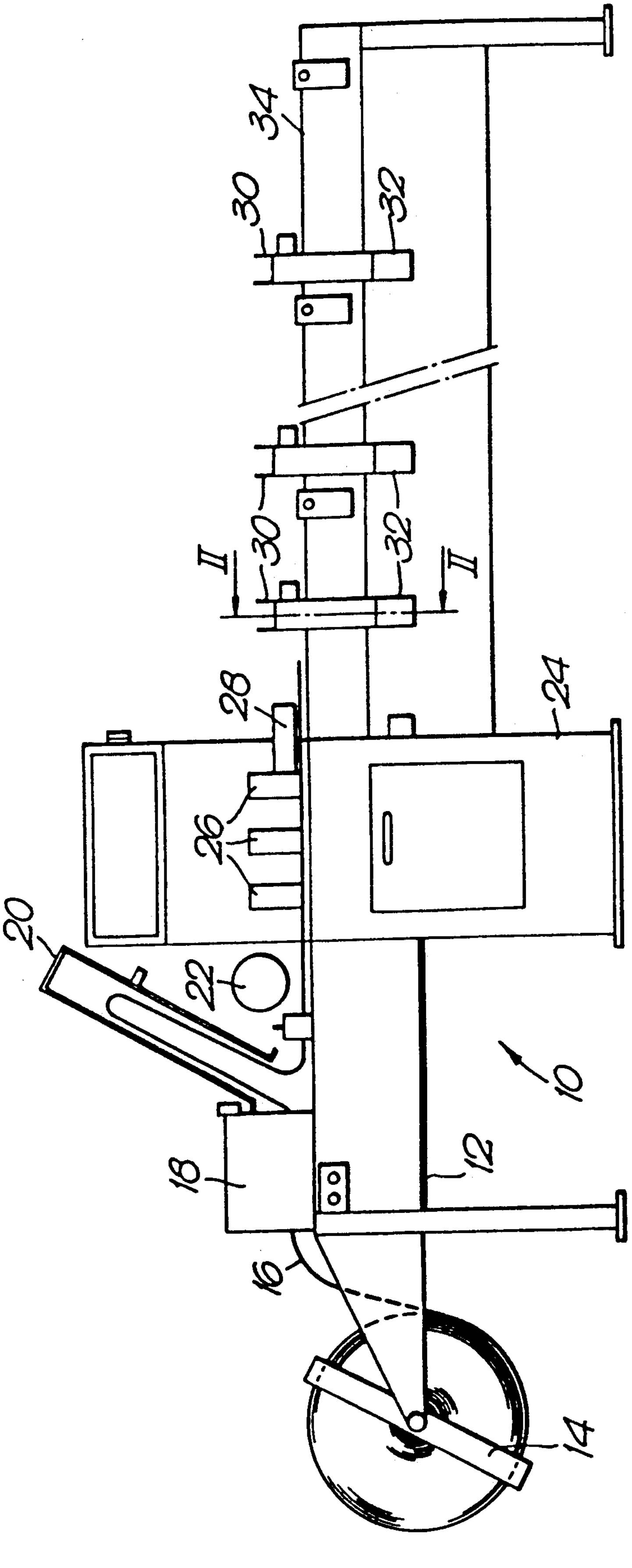
FIG. 1 is a schematic side elevation of one embodiment of a combined slat forming and assembly apparatus according to the invention.

The assembly apparatus 10 illustrated in the drawings include a main frame 12 on which is mounted a pay-off reel 14 of strip material 16, a crown forming unit 18 in which the strip is formed with an cross-sectional arcute bow, and a strip accumulator 20. Strip in-feed equipment and its motor are indicated very schematically at 22 and this feeds the strip material 16 into a machine stand cabinet 24 having cutting and punching die-heads 26 which cut the strip slat forming material to the length of slat required, and punch holes in the slat material for the passage of lift cords. The slat feeding means are formed among others by out-feed motor 28 that feeds the punched and cut slats through a number of assembly stations 30 in which the slats are laced into the ladders between the cross rungs as will be described later. The ladder feed means e.g. ladder lift means lifting a laced slat and the ladders together stepwise comprise linear lift motors 32 and guides (not shown in FIG. 1) on a lacing table 34 thereby serve to guide the slat material fed by the out-feed motor 28 or in other cases by the in-feed equipment itself along a defined feed path.

The above described arrangement is as earlier mentioned substantially conventional and further detailed discussion is not deemed necessary here.

Figure 2:
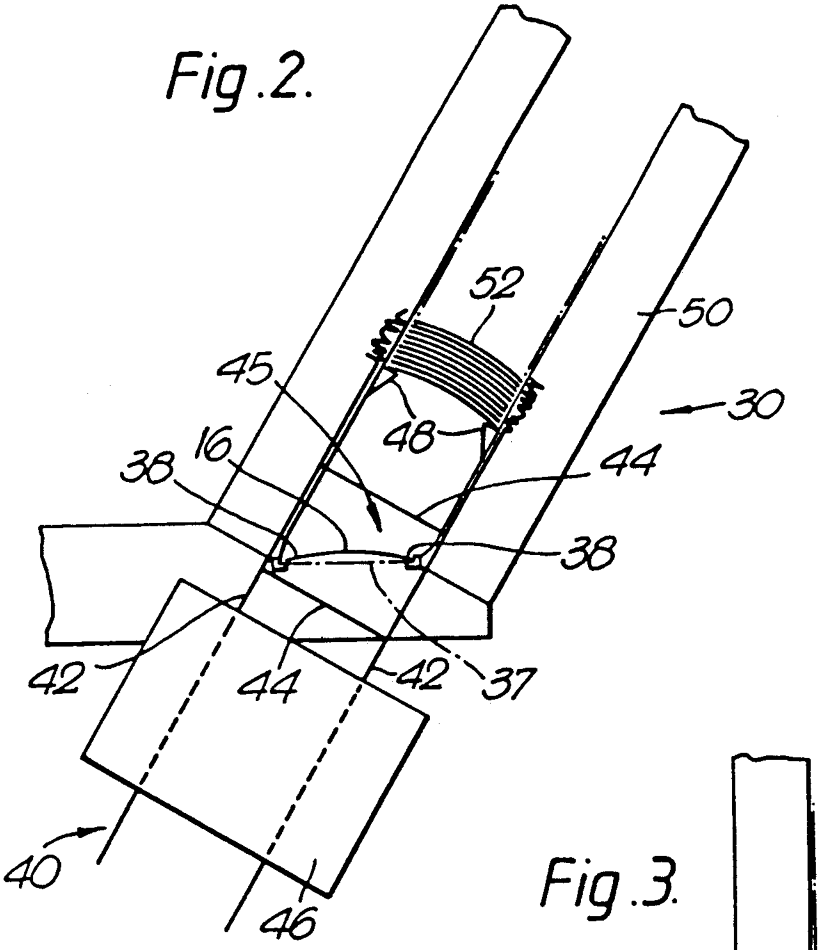
FIG. 2 is a schematic enlarged section taken along the line II—II of FIG. 1.

FIG. 2 shows here one of the assembly stations 30 according to the invention, in which slat material guides 36 are arranged to guide longitudinally the slat material 16 so that the plane 37 including the longitudinal sides 38 of the slat material extends horizontally.

The ladder with which the slats are to be laced is indicated by the reference numeral 40 and includes longitudinal side cords or members 42 and transversely extending rungs 44. It will be seen that a ladder cord tensioning and guiding unit 46 in combination with some resilient supporting pawls 48 cause the side cords 42 to be tensioned and extend at an angle to the vertical and the cross rungs 44 are spaced apart to form an opening 45 which is generally rectangular. With this arrangement, the plane 37 of the slat material is at an angle other than 90° to the direction of the side members 42 and extending therefore, approximately along a diagonal to the rectangular opening 45. There is thus provided a much greater "target" for the slat material than if the plane of the slat material, as conventionally, were parallel to the cross rungs and perpendicular to the side members.

The resilient supporting pawls 48 are mounted in slat holder guides 50, which are inclined at the same angle as the ladder cord side members 42 and serve to hold the assembled slats shown at 52, as the ladder is moved steadily up as a result of the in-feed of each successive slat. It will be appreciated that the slats themselves will become inclined so that they are parallel to the cross runs 44 as a cross rung below the slat moves upwardly along the guide 50. Common lifting means (not shown, but shown and described in the earlier referred to U.S. patents of applicant) are provided for this purpose, but are purely conventional other than the fact that they will be angled to move parallel to the guides 50.

Figure 3:
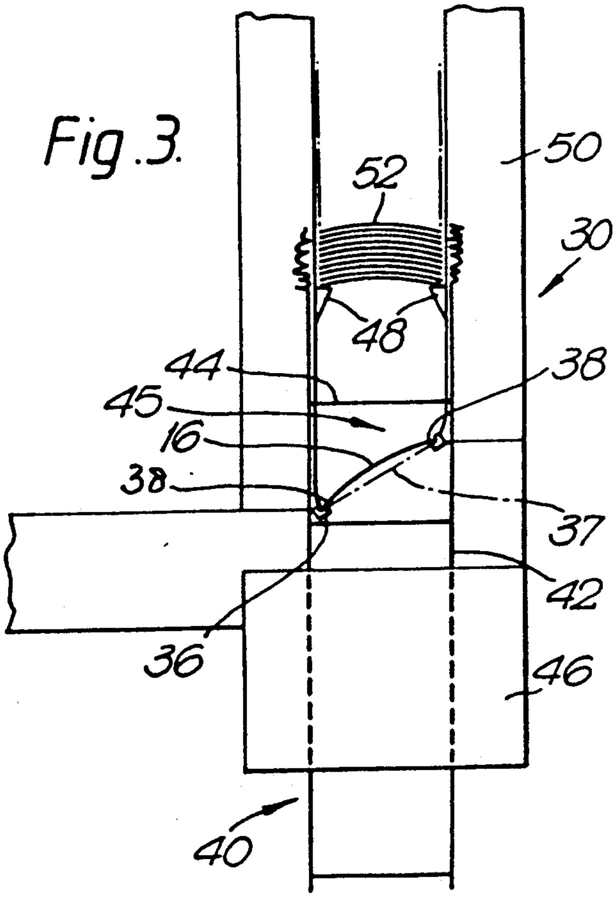
FIG. 3 is a similar view to FIG. 2 of an alternative arrangement.

If reference is now made to FIG. 3 a similar construction will be shown except that in this arrangement the slat holder guides 50 and the ladder cord tensioning-guiding unit 46 are arranged to guide the side cords 42 of the ladder 40 so that they extend in a vertical direction, and the slat guides 36 are arranged at an angle, so that the plane 37 is at an angle to the horizontal and therefore at an angle other than 90° to the side members 42 of the ladder.

Figure 5A:
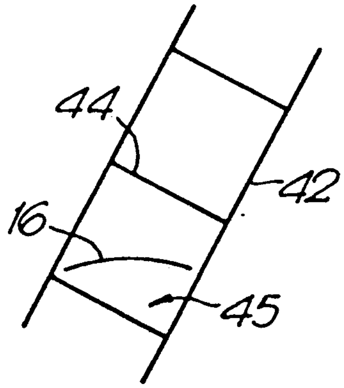
FIGS. 5*a*-5*d* show different arrangements for guiding the ladders according to the invention.
Figure 5C:
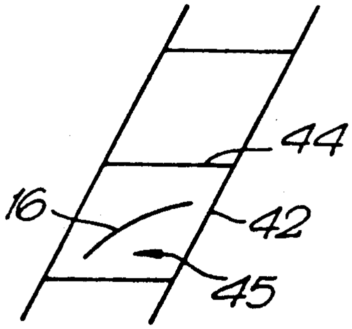
Figure 5B:
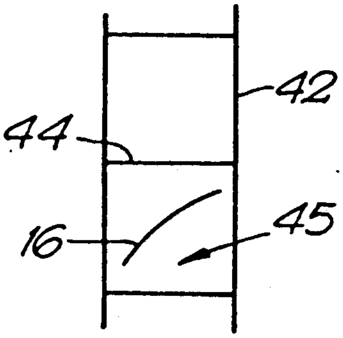
Figure 5D:
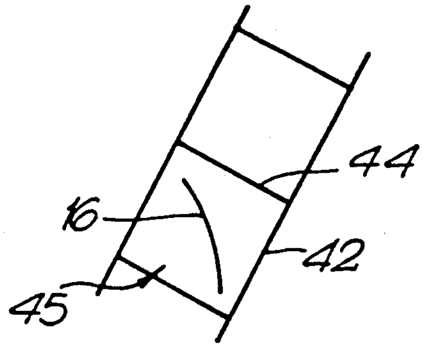

If one looks at FIG. 5 the arrangement shown in FIG. 2 is illustrated schematically in FIG. **5*a* while that in FIG. 3 is illustrated schematically in FIG. 5*b*. In FIG. 5*c* while the side cords 42 of the ladder are inclined to the vertical, the cross rungs 44 are shown extending horizontally, so that the opening 45 is in the form of a parallelogram. In this instance the slat 16 is inclined to the horizontal and extends substantially across the longer diagonal of this parallelogram. In FIG. 5*d* the side cords 42 are inclined to the vertical and the cross rungs 44 are substantially perpendicular thereto, and in this instance the slat material 16 is nearly vertical and extends across the opposite diagonal to that shown in FIG. 5*a*. In all of these arrangements the "target" for the slat material is larger than it would be if it were parallel to the cross rungs 44**, and in each case the plane of the slat generally bisects the angles formed between the side members and cross rungs. Where the opening defines a parallogram, the plane of the slot bisects its opposed acute angles.

Figure 4:
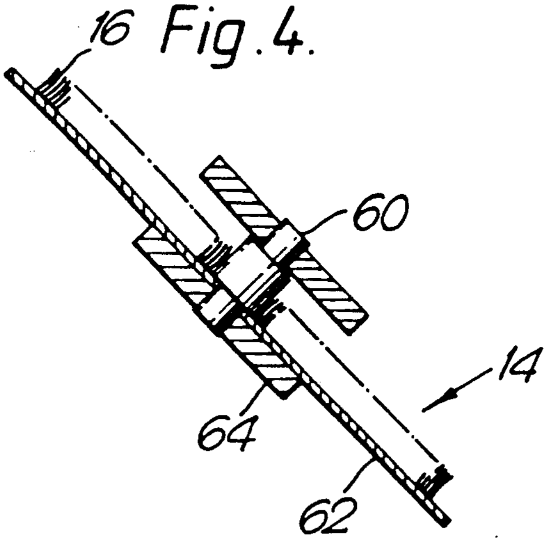
FIG. 4 is a schematic view through the coil strip material being unwound in the apparatus of FIG. 1.

In FIG. 4 there is illustrated the reel 14 of coil strip material 16. The axis of the reel shaft 60 is shown inclined to the horizontal and a friction plate 62 is mounted with its plane perpendicular thereto by a holder 64, so that the coil strip material 16 rests under gravity against this plate 62. As the coiled strip material 16 is unwound from the reel it will undergo friction with the plate and this will provide drag to the strip material the friction force producing this drag reducing as the weight and contact area of the coiled material fradually reduces as it is unwound from the reel.

In the FIGS. 2, 3 and 5 for the sake of clarity, the dimensions of the ladders are exagerated in respect of distance between cross rungs.

I claim:

1. Apparatus for mechanically assembling a venetian blind comprising slats made from elongated slat material carried by ladders comprising side members and cross rungs, said slat material having longitudinal edges, said apparatus comprising ladder feed means and ladder guide means, the ladder guide means guiding and spreading the side members and the cross rungs of the ladder such that front edges of the cross rungs and front edges of the side members define ladder openings for receiving slat material, and the ladder feed means feeding the ladder along a defined feed path, slat material feeding means and slat material guiding means for feeding and guiding the slat material in a slat feed direction along a defined path to and through the ladder openings, wherein at least said ladder guide means and said slat material guiding means are positioned relative to each other so that considered in a plane containing the front edges of the cross rungs and front edges of the side members and perpendicular to the slat feed direction, the side members are at an angle between 30° and 60° relative to a plane containing the longitudinal edges of the slat material when advancing to and through the openings of the ladders.

2. Apparatus according to claim 1, wherein the ladder guide means are positioned so that the side members are positioned at an angle to the vertical.

3. Apparatus according to claim 1, wherein the slat material guiding means are positioned so that the plane passing through the longitudinal edges of the slat material, as it is fed along said defined path and through said relevant openings, is inclined to the horizontal.

4. Apparatus according to claim 3, further comprising a reel for supplying said slat material, said reel having its axis of rotation inclined at an angle to the horizontal in the same sense as the slat material guiding means.

5. Apparatus according to claim 4, wherein the reel is positioned to rest against a friction surface, so that said reel is braked by said friction surface, as it rotates due to unwinding of the slat material.

6. An apparatus for mechanically assembling a venetian blind, said blind having at least two ladders and each ladder having laterally spaced side members and cross rungs such that front edges of the cross rungs and front edges of the side members define plural openings adapted to receive individual lengths of slat material to form successive slats of the venetian blind, said slat material having longitudinally extending edges and being substantially equal in width to the lateral spacing of said side members, said apparatus comprising:

ladder feed means for intermittently feeding said at least two ladders to sequentially position one of said plural openings of each ladder at a first position, portions of the front edges of said cross rungs at said first position defining a first plane for each ladder in which a respective one of said openings lies and said at least two ladders being located relative to one another with said first planes parallel and spaced a predetermined distance apart;

ladder guide means for simultaneously guiding said at least two ladders with adjacent cross rungs of each ladder held apart at least substantially parallel to one another, and with portions of the laterally spaced side members between said two adjacent cross rungs of each ladder held apart at least substantially parallel to one another, to provide the openings at said first positions with a predetermined parallelogram shape;

slat material feed means for feeding the slat material along a defined feed path successively through the respective openings in said at least two ladders at said first positions; and slat material guide means for guiding the slat material along said defined feed path, wherein the ladder guide means and the slat material guide means are positioned at an angle of other than 90° with respect to one another such that a predetermined acute angle between 30° and 60° in said first planes is formed between a second plane containing the longitudinal edges of the slat material and a line collinear with the front edge of one of the adjacent cross rungs at said first positions and wherein said acute angle lies in the first plane.

7. Apparatus according to claim 6, wherein the plane passing through the longitudinal edges of the slat material bisects the angle made by the side members and cross rungs defining the opening in which the slat material is inserted.

8. The apparatus according to claim 6, wherein said ladder guide means includes means for guiding the side members approximately vertically as viewed in a plane perpendicular to the feeding of the slat material.

9. The apparatus according to claim 6, wherein said ladder guide means includes means for guiding the side members of said ladders at an angle other than zero degrees (0°) to vertical as viewed in a plane perpendicular to the feeding of the slat material.

10. The apparatus according to claim 9, wherein said ladder guide means includes means for guiding the cross rungs of said ladders at an angle approximately perpendicular to the side members, whereby each said opening at said first position at least approximates a square.

11. The apparatus according to claim 9, wherein said ladder guide means includes means for guiding the cross rungs at an angle other than 90° with respect to the side members.

* * * * *